Feb. 11, 1958     T. L. METCALFE     2,822,732
AIRCRAFT WITH JET PROPULSION ENGINE AND GUN FIRING MEANS
Filed May 16, 1956     2 Sheets-Sheet 1
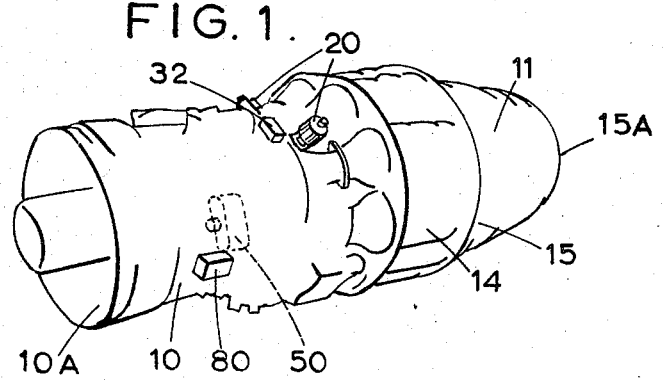
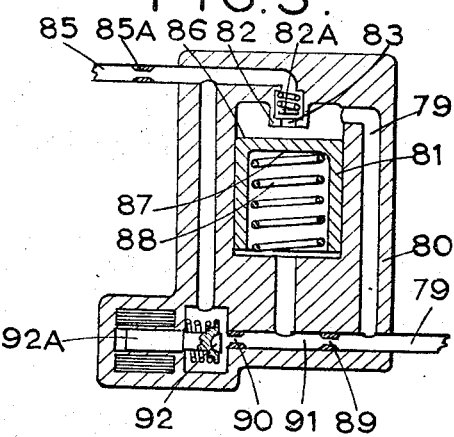
INVENTOR
Thomas Laidler Metcalfe
BY
Leech and Radue
ATTORNEYs

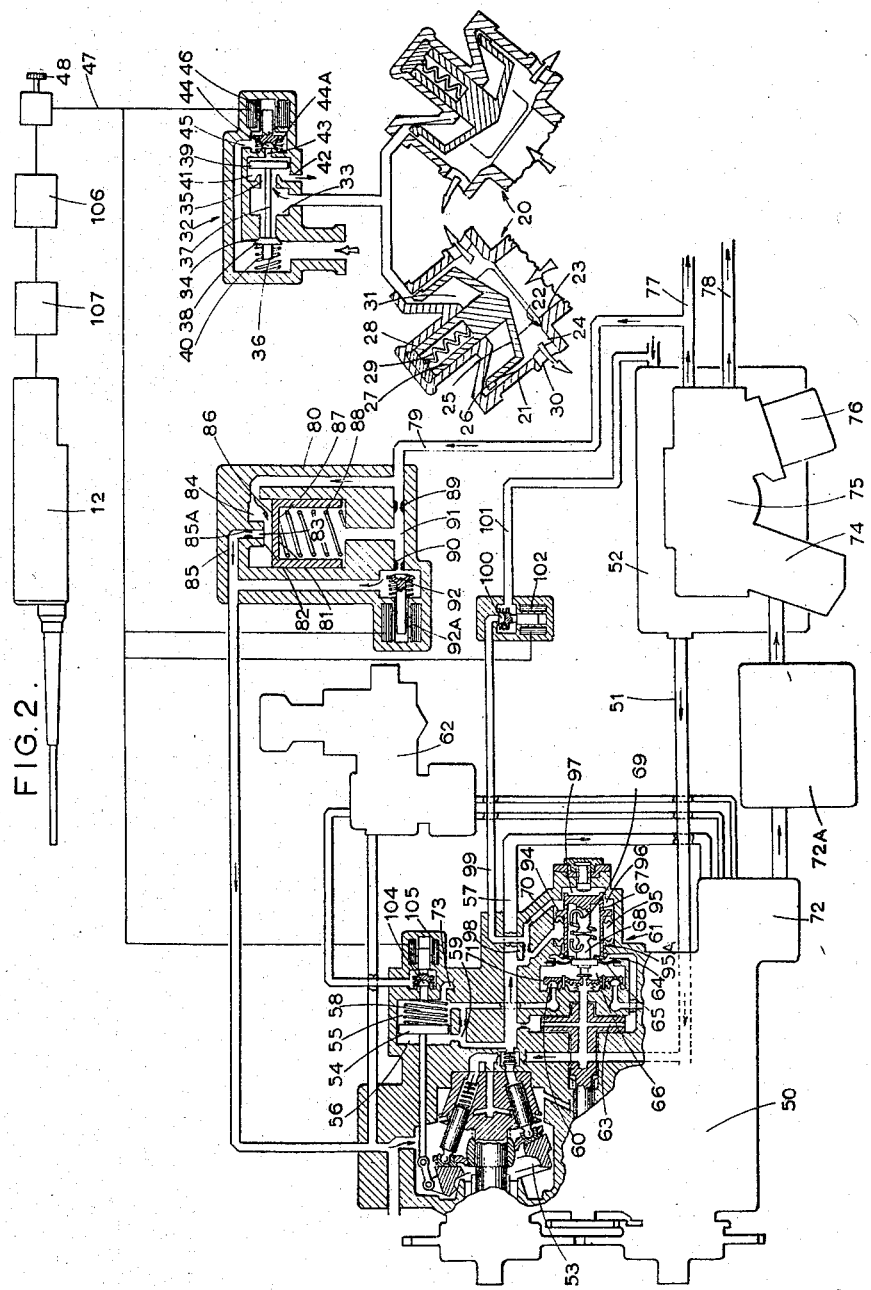

United States Patent Office 2,822,732
Patented Feb. 11, 1958

2,822,732

AIRCRAFT WITH JET PROPULSION ENGINE AND GUN FIRING MEANS

Thomas Laidler Metcalfe, Thorpe Grange, Thorpe, Ashbourne, England, assignor to Rolls-Royce Limited, Derby, England, a British company Application May 16, 1956, Serial No. 585,190

Claims priority, application Great Britain May 25, 1955

18 Claims. (Cl. 89—133)

This invention relates to aircraft, and relates more particularly to aircraft fitted with jet-propulsion gas-turbine engines and having a gun or guns and in which there is a tendency for a compressor of the engine to surge when the guns are fired, at least under certain conditions. Such an aircraft will be referred to as "an aircraft of the type described."

It will be appreciated that this tendency is undesirable in that it results in a serious loss of power, and may result in damage to the engine.

It is an object of the present invention to reduce or prevent this tendency to surge when the guns are fired.

It has been found that surging takes place at high rotational speed of the compressor when a row of blades near the outlet of the compressor is caused to stall. The effect is to reduce suddenly the flow of air to the combustion chambers with consequentially an over-rich mixture, high temperature, and loss of thrust.

According to the present invention, an aircraft of the type described has means for bleeding off air from the delivery of the compressor of the engine in which this tendency to surge is present, and means are provided to bring the bleeding-off means into operation on firing the guns.

In this context the term "delivery of the compressor" refers to a point downstream of the last stage of the compressor (where, as is usual, the compressor is of the multi-stage axial-flow type) and includes the air casing of combustion equipment directly connected to the compressor within which the pressure and temperature of the air will be substantially the same as at outlet from the last stage of the compressor.

Where the engine is of the compound type, having independently-rotating low-pressure and high-pressure compressors driven by separate turbines, the bleed valve or bleed valves may be located at the delivery of either compressor, depending on in which compressor the tendency to surge on firing of the guns occurs. The problem is, however, more acute in the case of the simple jet-propulsion gas turbine engine having a multi-stage axial-flow compressor driven through a single shaft by a single or multi-stage turbine.

According to a feature of the invention therefore, an aircraft of the type described is fitted with a simple jet-propulsion gas turbine engine having a multi-stage axial-flow compressor driven through a single shaft by a single or multi-stage turbine and has the compressor fitted with a bleed valve or valves to bleed off from the delivery of the compressor air compressed in the compressor, and means are provided to open the bleed valve or valves on firing the guns.

According to another feature of the invention, there is provided a control valve which is connected to atmosphere and to a pressure source, and which is connected to the bleed valve or to at least one of the bleed valves alternatively to apply a servo pressure load to the bleed valve or to vent the servo space of the bleed valve to atmosphere. Preferably the pressure load is applied to the bleed valve to close it, and the bleed valve is caused to open by the pressure of the compressor delivery air acting on it when the servo pressure load is released.

The valve may normally be exposed on both sides to compressor delivery pressure, the load to close it being normally greater either because of the differential area of the sides of the valve so exposed or by pressure on one side being aided by spring means or otherwise.

Thus according to another feature of the invention, the bleed valve may be in the form of a piston in a stepped cylindrical casing, the larger-area part of the casing being on one side of the piston, forming the servo space, and being connected to the control valve to be connected either to the pressure source, thereby to apply a pressure load to the piston, or to atmosphere, and the smaller-area part of the casing being in communication with the compressor delivery, so that, when the bleed valve is closed, the piston is subjected to the compressor delivery pressure over the smaller area. In this case the pressure source may conveniently be the compressor delivery pressure.

According to another feature of the invention the control valve is electrically connected to the gun-firing button to be operated when the button is pressed. Preferably a delay device is incorporated in the gun-firing mechanism to ensure that the bleed valve opens before the gun fires.

Preferably when the guns are fired as well as bleeding off air from the compressor of the engine the fuel supply thereto is temporarily reduced and when a top speed governor and acceleration control unit are fitted the top speed governor is set to govern at a lower speed and the acceleration control unit is isolated from the means by which it normally adjusts the fuel pump delivery.

One embodiment of the invention will now be described with reference to the accompanying drawing, in which:

Figure 1 is a perspective view of a gas turbine engine,

Figure 2 is a diagrammatic layout of the controls, and

Figure 3 is a detail showing an alternative form of certain parts illustrated in Figure 2.

The aircraft comprises a gas-turbine jet-propulsion engine mounted in the fuselage and discharging to atmosphere through a jet pipe which exhausts at the tail end of the aircraft. In the forward section of the fuselage there are provided a number of guns each of which has the usual ammunition feed arrangement and a discharge chute through which spent cartridges are discharged over-board. The air intakes for the engine open one on either side of the fuselage to the rear of the guns and face forwards to take advantage of the velocity head of the airstream when the aircraft is in flight.

It has been found that when the guns are fired in flight under certain conditions, particularly at high altitudes, surging of the compressor of the engine is likely to occur.

The cause of the surging is not fully understood, but it is believed that the intake conditions of the compressor are affected by pressure waves resulting from the firing of the guns, and that this results in surging of the compressor. It is also believed that gases discharged from the gun ports may find their way into the intake of the engine, these gases having a calorific value and thus causing instantaneous acceleration of the engine resulting in the occurrence of surging of the compressor.

The gas-turbine engine will now be described in detail together with the means for the prevention of surging. The engine comprises an axial-flow compressor 10 which receives air from the intake 10A and delivers it to combustion equipment 14 where it is burnt with fuel, the products of combustion passing through a turbine 15 which is connected to the compressor to drive it. The gases are then exhausted from the turbine into the jet pipe 11 from which they pass to atmosphere through the propelling nozzle 15A to drive the aircraft.

The engine is provided with bleed valves 20 at the outlet from the compressor by which air compressed in the compressor may be bled off to atmosphere. Each bleed valve comprises a casing 21 of stepped cylindrical form, the corner 22 between the smaller diameter bore 23, and the radial face 24 of the casing being chamfered to afford a seating surrounding the bore, and the bleed valve also comprises a piston 25 which co-operates with the seating. The smaller-diameter bore 23 is in communication with the compressor outlet duct, from which it forms an outlet port. The piston is housed in the larger-diameter bore 26 of the casing, which is concentric with the smaller-diameter bore, so that when the bleed valve is closed the area of the piston which is acted on by the compressor delivery pressure, that is the area which closes off the port, is less than the area of the opposite side of the piston which is exposed to the pressure within the larger-diameter part of the closed casing. There are also provided a central rod 27 forming part of the piston and sliding in a co-operating recess 28 in the casing to act as a guide for a piston, and a light tension spring 29 between the piston and the casing to load the piston in the sense of opening the port. The casing is provided with outlet holes 30 in the circumference of the larger-diameter portion adjacent the seating, which open to atmosphere and which are substantially unobstructed when the piston is moved to its limiting position in the sense of opening the port.

The space 31 within the casing on the side of the piston remote from the port is connected to a control valve, and there may be provided a common control valve 32 connected to a series of bleed valves.

The connection from the bleed valves leads to a chamber 33 within the control valve, the chamber having ports 34, 35 at either end. Port 34 communicates with the compressor delivery pressure and port 35 communicates to atmosphere. These ports are controlled by a valve member having a rod 37 passing through the chamber and having flanges 38 and 39 at either end, and it is arranged that on movement of the rod in one sense the communication to the compressor delivery pressure is closed and the communication to atmosphere is opened, and vice versa. The rod is loaded by a spring 40 to move in the sense of closing the port to compressor delivery pressure and of opening the port to atmosphere, and it is arranged that the flange which controls the port opening to atmosphere has a small clearance in a further chamber 41. This chamber has the vent 42 to atmosphere in its periphery at the end adjacent the port, and has an aperture 43, in the centre of its opposite end which is controlled by a half-ball valve 44 operated toward closure against a spring 44A by a solenoid 46. The space 45 on the other side of the central aperture from the chamber is in communication with the compressor delivery pressure and thus it will be appreciated that when the co-operating half-ball valve is open there will be a flow through the aperture and through the small clearance between the flange and the wall of its chamber, causing a pressure difference to exist across the flange 39 which is sufficient to overcome the spring load and to hold the valve member in the position to close the port 35 communicating with atmosphere and to open the port 34 communicating with the compressor delivery. When the half-ball valve is closed the flange will be subjected to atmospheric pressure on each side and the position of the valve member will be determined by the spring 40.

The solenoid 46 is operated to close the half-ball valve, by means of an electrical circuit 47, when the button 48 firing the gun 12 is pressed, thus venting the space 31 within the larger-diameter part of the bleed valve casing to atmosphere, and causing the bleed valves 20 to open.

The engine comprises a fuel system including a positive-displacement swash-plate type of pump 50 which is driven by the engine and draws fuel from the aircraft fuel tank via a low-pressure fuel line 51 containing a filter 52. The delivery of the pump depends on the angle of the swash plate 53 which is controlled by a servo piston 54 working a cylinder 55, the cylinder space 56 on one side of the piston being connected directly to the pump delivery and the space 58 on the other side of the piston being connected to the delivery 57 through a restrictor 59. The pressure in the second space 58 is controlled by means of a number of vent valves of which one 60 is associated with the top speed governor 61, another is associated with an acceleration control unit 62, and a third (not shown) is associated with a barometric pressure control unit (not shown).

The top speed governor comprises a centrifugal impeller 63 driven by the engine and delivering to a cylinder space 64 on one side of a diaphragm 65. The space 66 on the other side of the diaphragm is connected to the pump inlet pressure, and thus the diaphragm is loaded with a force which is a function of the engine speed. The diaphragm is also loaded in opposition to this force by a tension spring 67, one end of which is secured to the diaphragm rod 68 and the other end of which is secured to a piston 69 which is arranged to move between two limiting positions in a cylinder. The diaphragm rod on the side of the diaphragm remote from the spring bears on the ends of a pair of levers 71 pivoted at their centres, the other ends of which carry the half-ball vent valves 60. Thus it will be seen that when the load due to the speed of the engine overcomes the spring load the levers will be rocked by movement of the diaphragm to open the vent valves and thus to reduce the servo pressure in the second cylinder space 58 and to reduce the stroke of the pump, thereby reducing the fuel supply to the engine.

The acceleration control unit 62 is of the kind described and claimed in United States Patent 2,643,514 (Rolls-Royce Limited) and comprises essentially a pivoted lever carrying a half-ball vent valve which controls the outlet of a vent pipe from the second cylinder space, and the lever is loaded in the sense of opening the half-ball valve by a load proportional to the fuel flow to the engine, and is loaded in the opposite sense by a load proportional to the compressor delivery pressure of the engine. The load proportional to the fuel flow is obtained by applying the pressure difference across a linear-flow valve in the fuel delivery pipeline to opposite sides of a diaphragm of which the diaphragm rod is in contact with the lever.

The barometric pressure control unit is of the kind described and claimed in British Patent 583,487 and in U. S. Patent 2,506,694 (J. Lucas Limited) and the vent valve of the unit controls the outlet from a vent pipe 73 (shown broken away in the drawing) connected to the second cylinder space 58 in such a way as to reduce the fuel flow to the engine on reduction of the atmospheric pressure such as occurs on increase of altitude.

It will be appreciated that the top speed governor overrides the barometric pressure control at the maximum speed of the engine, and the acceleration control overrides the barometric pressure control during acceleration.

The fuel delivery pipeline from the pump leads by way of the linear-flow valve 72 to fuel cooled oil cooler 72A, a throttle valve 74 and a high-pressure shut-off cock 75 to a pressurising valve 76, to which are connected a pair of manifolds one 77 for the pilot burner, and the other for the main fuel supply 78. It is arranged that when the fuel delivery pressure reaches a certain value the pressurising valve 76 opens to admit fuel to the main fuel manifold, the delivery pipeline being in continuous communication with the pilot burner fuel manifold. From the manifolds the fuel is led to burners in the combustion equipment of the engine, and the burners are preferably of the type described in British Patent 645,908 (Rolls-Royce Limited).

It is arranged that the fuel supply to the engine is reduced temporarily while the guns are fired, and for this purpose there is provided a by-pass fuel line 79 which is connected to the pilot burner manifold and at its other end to a low-pressure fuel line, and which has a fuel bleed unit 80 connected in it between its ends. This unit comprises a valve which controls the flow through the by-pass line and which comprises a piston 81 which engages with a seating 82 around a port 83 the spaces on each side of which are connected to the upstream portion 79 and downstream portion 85 of the by-pass line. A restrictor 85A is provided in the portion 85. The piston 81 is subjected on one face 86, in the sense to open the valve, to the pressure in the by-pass line upstream of the valve and is subjected on the other face 87 to the load of a spring 88 and to the pressure between a pair of restrictors 89, 90 in a pipeline 91 connected at its upstream end to the by-pass line 79 upstream of the valve and at its downstream end to the by-pass line 85 downstream of the valve. The downstream restrictor 90 of the two in this pipeline is controlled to be opened or closed by a half-ball valve 92 operated by a solenoid 92A. The solenoid is operated to open the half-ball valve when the gun-firing button 48 is pressed, by means of an electrical circuit.

It will be appreciated that when the solenoid-operated half-ball valve 92 is closed the pressure between the restrictors 89, 90 will be equal to the pressure in the by-pass line upstream of the valve, and thus the pressure on either side of the piston 81 will be equal and the piston will be loaded by the spring 88 unto the seating 82 to close the valve. When the solenoid-operated half-ball valve 92 is opened the pressure between the restrictors will be substantially less than the pressure in the by-pass line upstream of the valve and the fluid pressure load acting on the piston will overcome the spring load and the by-pass valve will be opened to bleed off fuel from the pilot fuel manifold 77. Bleeding off fuel in this manner reduces the tendency of the compressor to surge.

The arrangement shown in Figure 3 illustrates a slightly different arrangement of fuel by-pass control valve. In this arrangement a non-return valve 82A is provided immediately downstream of the seating 82 and restrictor 85A is moved to a position just downstream of the junction of the conduits 85 and 91.

It is necessary to adjust the top speed governor of the engine to govern at a lower speed when fuel is bled off in this manner and the engine is under the control of the governor, and for this purpose the piston to which the governor diaphragm tension spring is attached is adjusted between its limiting positions by the following means.

The piston 69 to which the tension spring is attached is formed with a central hollow cylindrical part which houses the spring within it and is also formed with a peripheral flange 94 which co-operates with the bore of the cylinder and has an annular cylindrical space 95, 96 on either side of it. The central cylindrical portion of the piston has sealing engagement 95A with the casing at the end nearer to the diaphragm, thus closing the annular cylinder space 95 on this side of the flange which is connected directly to the pump delivery line. The annular cylinder space 96 on the other side of the flange also communicates with the space 97 at the end of the central part of the piston so that the piston is of differential area, and this space 96, 97 is connected to the delivery line 57 through a restrictor 98 and has a vent line 99 leading therefrom to a low-pressure fuel line 101, the outlet from the vent line being controlled by a solenoid-controlled half-ball valve 100 operated by a solenoid 102. When this half-ball valve is closed the pressures in the cylinder spaces 95, 96, 97 on either side of the flange 94 of the piston are equal, and thus the piston, owing to its differential area, is urged to the limiting position in which the load exerted on the tension spring 67 has a lower value. When the half-ball vent valve 100 is opened the pressure on the larger-area side of the piston 69 falls and it is arranged that the pump delivery pressure acting on the smaller-area side of the piston causes the piston to move to its other limiting position in which the load on the tension spring 67 has a higher value. The solenoid 102 is operated to close the half-ball valve 100 when the gun-firing button is pressed, by means of an electrical circuit.

There is also provided an isolating half-ball valve 104 in the vent line between the second cylinder space 58 of the pump servo system, and the half-ball vent valve of the acceleration control unit. This isolating valve is operated by a solenoid 105. The solenoid is operated to close the half-ball valve 104 when the gun-firing button is pressed, by means of an electrical circuit, and this prevents the acceleration control unit exerting any controlling effect when the mechanism being described is operative to prevent surging. This is because it is found that this mechanism results in a fall in the compressor delivery pressure, which would be sensed by the acceleration control unit, and the unit would operate to reduce the fuel flow to the engine which would result in a further fall in the compressor delivery pressure, resulting in a rapid deceleration of the engine.

It may be arranged that the various solenoids referred to are connected in parallel with one another, and in series with a switch operated by the gun-firing button and with a battery or other source of current. If desired a delay relay shown at 106 may be inserted in the gun-firing circuit adjacent to the gun relay 107 to ensure that the guns do not fire until the fuel and air bleeds have come into operation; with the system above described the delay might be of the order of ½₀ second.

The system above-described has been found to be effective in preventing surging which otherwise occurs when the guns are fired in certain combinations of aircraft and engines.

What I claim is:

1. An aircraft fitted with a jet-propulsion gas-turbine engine and having at least one gun with firing means therefore, and from which firing there is a tendency for a compressor of the engine to surge at least under certain conditions, valve means arranged in the delivery from the compressor of said engine through which may be bled off air compressed in said compressor, means normally closing said valve, and means connected to the gun firing means whereby said valve means are opened on firing the gun.

2. An aircraft of the type described which is fitted with a simple jet-propulsion gas-turbine engine having a multi-stage axial-flow compressor driven through a single shaft by a turbine and having a compressor fitted with bleed valve means to bleed off from the delivery of the compressor air compressed in the compressor, a gun and firing means therefor on said aircraft, and means to open the bleed valve means when the firing means for the gun is actuated.

3. An aircraft as claimed in claim 1 in which the bleed valve has a servo-pressure space and an area responsive to pressure therein to close the valve, and there is provided a control valve having a chamber which is selectively connected to atmosphere or to a pressure source and which chamber is also connected to the bleed valve means alternatively to apply a servo-pressure load to the bleed valve area or to vent the servo-pressure space of the bleed valve to atmosphere.

4. An aircraft as claimed in claim 3 in which the servo-pressure space of the bleed valve is connected to a valve chamber having a control valve member co-operating with a pair of ports and arranged in one position to connect the chamber to the compressor delivery and to cut off communication with atmosphere and in a second position to connect the chamber to atmosphere and to cut off communication with the compressor delivery, said control valve member being normally held in said one position by a pressure load acting on a flange thereof, and being urged toward said second position by a spring, and there being another valve member arranged so that on closing thereof the said pressure load is cut off, said last-mentioned valve member being operated toward closing by a solenoid in an electric circuit closed when the gun-firing means is operated.

5. An aircraft as claimed in claim 3 in which the servo-pressure load is applied to the bleed valve to close it and the bleed valve is caused to open by the pressure of the compressor delivery air acting upon it.

6. An aircraft as claimed in claim 5 in which the control valve is electrically connected to the gun-firing means so as to be moved when the firing means is operated.

7. An aircraft as claimed in claim 5 in which the bleed valve is normally exposed on both sides to compressor delivery pressure.

8. An aircraft as claimed in claim 5 the bleed valve being in the form of a piston in a stepped cylindrical casing, the larger-area part of the casing being on one side of the piston, forming the servo-pressure space, and being connected to the control valve to be connected either to the pressure source, thereby to apply a pressure load to the piston, or to atmosphere, and the smaller-area part of the casing being in communication with the compressor delivery, so that, when the bleed valve is closed, the piston is subject to the compressor delivery pressure over the smaller area.

9. An aircraft as claimed in claim 8 in which the pressure source is the compressor delivery pressure.

10. An aircraft as claimed in claim 1 having fuel delivery means and in which means are provided to reduce the fuel delivery under the control of said gun-firing means.

11. An aircraft as claimed in claim 10 in which the engine is provided with an acceleration control unit and means to isolate said unit while the gun-firing means is actuated.

12. An aircraft as claimed in claim 10 having burners for fuel delivered thereto through a pipe by said fuel delivery means in which a by-pass connection is provided between said pipe to said burners and a low pressure point in said fuel delivery means, and mechanism to open said by-pass actuated by said gun-firing means to thereby reduce the fuel flow.

13. An aircraft as claimed in claim 12 in which said by-pass is normally closed by a spring closed valve means exposed on both sides to the pressure of fuel in the by-pass, means to reduce the pressure on the closing side of the valve including a further valve adapted to spill said pressure, a solenoid arranged to open said valve and electrically connected to the gun-firing means to be energized when said means is operated, whereby the pressure on the other side of first-mentioned valve overcomes the spring and opens the first-mentioned valve to allow the escape of fuel.

14. An aircraft as claimed in claim 12 having a maximum speed governor, means actuated by said governor to control the fuel supply to said engine and means responsive to the gun-firing means to automatically set the governor to give a lower maximum speed when the fuel is temporarily reduced while the guns are being fired.

15. An aircraft as claimed in claim 14 in which the governor setting is controlled by a tension spring, a movable piston, means connecting an end of said spring to said movable piston, and means controlled by said gun-firing means for displacing the piston to adjust the spring setting while the guns are fired.

16. An aircraft as claimed in claim 15 having a vent pipe associated with one side of said piston and in which the last-mentioned means includes a normally open valve in said vent pipe which is closed by operation of the gun-firing means, whereby the said piston is moved from a limiting position in which the load on the tension spring has a lower value to another limiting position in which the load on the spring has a higher value.

17. An aircraft as claimed in claim 15 in which the fuel is supplied by an acceleration control unit supplying pressure to said piston, and a swash-plate-type fuel pump, a piston operating in a cylinder and connected to control the swash-plate setting, isolating valve for isolating said cylinder from said unit, and means responsive to the gun-firing means to actuate said isolation valve.

18. An aircraft as claimed in claim 17 in which a delay-action relay in the gun-firing means ensures that said bleeding-off means, said fuel-supply-reducing means, said resetting means, and said isolating valve have time to operate before the gun fires.

References Cited in the file of this patent

UNITED STATES PATENTS

| | | |
|---|---|---|
| 2,455,292 | Borden | Nov. 30, 1948 |
| 2,644,400 | Hofer | July 7, 1953 |
| 2,696,345 | Hopper | Dec. 7, 1954 |
| 2,732,125 | Ruby | Jan. 24, 1956 |
| 2,750,848 | Boyer | June 19, 1956 |